UNITED STATES PATENT OFFICE.

EMIL RUEFF, OF NEW YORK, N. Y.

COMPOUND OF MAGNESIA.

SPECIFICATION forming part of Letters Patent No. 694,424, dated March 4, 1902.

Original application filed August 3, 1898, Serial No. 687,595. Divided and this application filed August 7, 1899. Serial No. 726,409. (No specimens.)

*To all whom it may concern:*

Be it known that I, EMIL RUEFF, a resident of the city of New York, borough of Manhattan, county and State of New York, have invented an Improved Fireproofing and Heat and Sound Insulating Compound, of which the following is a specification.

This invention relates to improvements in fireproofing and heat and sound insulating media, and has for its object to produce a compound suitable for use as building-blocks, boiler-coverings, and in like situations where a non-conducting fireproof compound is desirable.

This application is a division of my application for patent, Serial No. 721,616, filed June 23, 1899, which itself is a division of my application, Serial No. 687,595, filed August 3, 1898, which resulted in Patent No. 630,115. It is therefore to be understood that this application is a division of my said application, Serial No. 687,595.

My invention consists in the article hereinafter claimed.

In carrying out my invention I produce a compound of magnesia different from the ordinary carbonate of magnesia of commerce, in that it has a greater percentage of water than the said ordinary carbonate of magnesia. The carbonate of magnesia of commerce is either the light carbonate of magnesia, the heavy carbonate of magnesia, or the mineral magnesite. The light carbonate of magnesia may be said to have the following two formulæ:

$$3MgO, 2CO_2 + 3H_2O,$$
$$4MgO, 3CO_2 + 4H_2O,$$

which latter formula also represents the composition of heavy carbonate of magnesia of commerce. The mineral magnesite $MgOCO_2$ is the normal carbonate of magnesia. The basic or alkaline carbonates which I produce contain more water and less acid in proportion and are in part indicated by the following formulæ:

$$7MgO, 2CO_2 + 10H_2O.$$
$$3MgO, 1CO_2 + 4H_2O.$$
$$5MgO, 2CO_2 + 8H_2O.$$
$$6MgO, 1CO_2 + 8H_2O.$$
$$4MgO, 2CO_2 + 5H_2O.$$

This new carbonate of magnesia I shall hereinafter designate as "alkaline magnesite."

In producing alkaline magnesite I may proceed in various ways. One way to produce alkaline magnesite is as follows: I mix one part of powdered calcined magnesite with twenty parts of water and conduct to such mixture, while in a state of agitation, carbonic-acid gas under a pressure of about twenty-five pounds per square inch until the mixture has absorbed less than one part, by weight, of the carbonic-acid gas, so as to prevent the formation of a normal carbonate of magnesia. The whole mass is then heated gradually to a temperature less than or preferably to about 160° Fahrenheit, drained, dried, and may then be compressed under a pressure of from two hundred to one thousand pounds per square inch into the desired shape. The article thus obtained is a carbonate of magnesia which contains in proportion to the MgO less carbonic acid and more chemically-bound water than any other commercial carbonate of magnesia heretofore produced. The alkaline magnesite thus obtained differs from the ordinary magnesite in that it contains in proportion to its magnesia less carbon dioxid than ordinary magnesite and also in that it contains chemically-combined water, which is not present in ordinary magnesite. The ordinary magnesite is a heavy and dense mineral, while the article which I produce is a very finely divided and light product, which forms porous lumps in the presence of water. The excess of chemically-bound water and the method of preparing the mass vastly improves the condition of the substance. It is very light in weight, and, unlike all other articles of the same class, it possesses great tensile strength and elasticity and is able to withstand not only the roughest handling, but also the severest test to which any building material used for lining interior walls, ceilings, &c., may be subjected. This substance has great resistance to the influence of heat and may be used for fireproofing, and being a non-conductor of sound may be also used as an isolating-lining for covering walls, ceilings, ice-boxes, safes, &c., and may be used as a pipe or boiler covering.

What I claim, and desire to secure by Letters Patent, is—

1. A compound of magnesia, carbon dioxid, and water, which contains at least twice as many molecules of magnesia as of carbon dioxid.

2. A compound of magnesia, carbon dioxid, and water, which contains at least twice as many molecules of magnesia as of carbon dioxid, and more molecules of water than of magnesia, said compound being very finely divided and light, forming porous lumps in the presence of water, being a bad conductor of sound and heat, and possessing when pressed or molded great tensile strength and elasticity.

EMIL RUEFF.

Witnesses:
  MAURICE BLOCK,
  GEO. E. MORSE.